US012080952B2

(12) United States Patent
Chang et al.

(10) Patent No.: US 12,080,952 B2
(45) Date of Patent: Sep. 3, 2024

(54) ANTENNA MODULE AND ELECTRONIC DEVICE

(71) Applicant: ASUSTeK COMPUTER INC., Taipei (TW)

(72) Inventors: Jo-Fan Chang, Taipei (TW); Yu Chen, Taipei (TW); Jhih-Ning Cheng, Taipei (TW); Yu-Hsun Huang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 108 days.

(21) Appl. No.: 17/990,744

(22) Filed: Nov. 21, 2022

(65) Prior Publication Data

US 2024/0106112 A1 Mar. 28, 2024

(30) Foreign Application Priority Data

Sep. 28, 2022 (TW) .................................. 111136693

(51) Int. Cl.

*H01Q 3/04* (2006.01)
*H01Q 1/22* (2006.01)
*H01Q 5/307* (2015.01)
*H01Q 9/04* (2006.01)
*H01Q 19/10* (2006.01)

(52) U.S. Cl.

CPC ............. *H01Q 3/04* (2013.01); *H01Q 1/2266* (2013.01); *H01Q 5/307* (2015.01); *H01Q 9/0421* (2013.01); *H01Q 19/10* (2013.01)

(58) Field of Classification Search

CPC ........ H01Q 3/04; H01Q 1/2266; H01Q 5/307; H01Q 9/0421; H01Q 19/10; H01Q 5/371; H01Q 3/16; H01Q 1/245; H01Q 19/30

See application file for complete search history.

(56) References Cited

U.S. PATENT DOCUMENTS

2017/0125916 A1* 5/2017 Camacho ............... H01Q 5/371

FOREIGN PATENT DOCUMENTS

CN 109638426 4/2021
CN 113937469 1/2022
WO WO-0059067 A2 * 10/2000 ....... G06K 19/07749

* cited by examiner

*Primary Examiner* — Daniel D Chang
(74) *Attorney, Agent, or Firm* — JCIPRNET

(57) ABSTRACT

An antenna module is disposed to an electronic device includes a fixed member, a rotating component, a reflector, a director, and an antenna unit. The electronic device includes a first body and a second body. The first body has a first surface and a second surface. The fixed member is disposed to the first body fixedly. The rotating component is connected to the fixed member rotatably. The reflector and the director are disposed to the rotating component. The antenna unit is disposed to the first body and between the reflector and the director. When the first body and the second body rotate relative to each other, the reflector is located between the antenna unit and one of the first surface and the second surface, and the director is located between the antenna unit and another one of the first surface and the second surface.

10 Claims, 14 Drawing Sheets

ANTENNA MODULE AND ELECTRONIC DEVICE

CROSS-REFERENCE TO RELATED APPLICATION

This application claims the priority benefit of Taiwan application serial no. 111136693, filed on Sep. 28, 2022. The entirety of the above-mentioned patent application is hereby incorporated by reference herein and made a part of this specification.

BACKGROUND

Technical Field

The disclosure relates to an antenna module and an electronic device having the antenna module.

Description of Related Art

Electromagnetic waves radiated by antennas may be harmful to human health. Therefore, consumer electronic devices must comply with the safety regulations of specific absorption ratio (hereinafter referred to as SAR value) of electromagnetic waves to limit the energy or the maximum amount of radiation that may be radiated by an electronic device. In order for the SAR value to meet the test specification, the antenna of a conventional electronic device is often disposed in the area far away from the test surface.

However, in the current electronic device, since a two-in-one notebook computer is used in the tablet mode and the computer mode, the test surface cannot be limited to a specific area of the body, resulting in the need to set the antenna in a compromised position, or to further reduce the performance of the antenna or reduce the transmission power of the network card, thereby sacrificing the wireless performance of the electronic device to meet the test specification of the SAR value.

SUMMARY

According to the first aspect of this disclosure, an antenna module adapted to be disposed to an electronic device is provided. The electronic device includes a first body and a second body which are pivotally connected to each other. The first body has a first surface and a second surface that are opposite to each other. The antenna module includes a fixed member, a rotating component, a reflector, a director, and an antenna unit. The fixed member is adapted to be disposed to the first body fixedly. The rotating component is connected to the fixed member rotatably along an axial line. The reflector is disposed to the rotating component. The director is disposed to the rotating component. The antenna unit is adapted to be disposed to the first body fixedly and on the axial line, and is disposed between the reflector and the director. When the first body and the second body rotate relative to each other, the rotating component rotates relative to the fixed member. The reflector is located between the antenna unit and one of the first surface and the second surface, and the director is located between the antenna unit and the other one of the first surface and the second surface, so that an antenna signal of the antenna unit radiates toward the other one of the first surface and the second surface.

According to the second aspect of this disclosure, an electronic device is provided. The electronic device includes a first body, a second body, and an antenna module. The first body has a first surface and a second surface that are opposite to each other. The second body is pivotally connected to the first body and has a display surface. The antenna module includes a fixed member, a rotating component, a reflector, a director, and an antenna unit. The fixed member is disposed to the first body fixedly. The rotating component is connected to the fixed member rotatably along an axial line. The reflector is disposed to the rotating component. The director is disposed to the rotating component. The antenna unit is disposed to the first body fixedly and on the axial line, and is disposed between the reflector and the director. When the second body rotates relative to the first body and the display surface faces the first surface, the rotating component rotates relative to the fixed member, the reflector is located between the antenna unit and the second surface, and the director is located between the antenna unit and the first surface, so that an antenna signal of the antenna unit is radiated toward the first surface. When the second body rotates relative to the first body, and the second surface is located between the first surface and the display surface, the rotating component rotates relative to the fixed member, the reflector is located between the antenna unit and the first surface, and the director is located between the antenna unit and the second surface, so that the antenna signal of the antenna unit radiates toward the second surface.

Based on the above, in the electronic device of the disclosure, through the design of rotating the rotating component relative to the fixed member and respectively disposing the reflector and the director to the rotating component, the radiation direction of the antenna signal of the antenna unit in the antenna module changes with the relative rotation of the first body and the second body. Therefore, the radiation direction of the antenna signal is directed away from the test surface of the SAR value of the electronic device in different usage modes (i.e., the radiation is directed away from the user), thereby reducing the SAR value of the electronic device and avoiding sacrificing the wireless performance in order to pass the test specification.

DETAILED DESCRIPTION OF DISCLOSED EMBODIMENTS

Figure 1A:
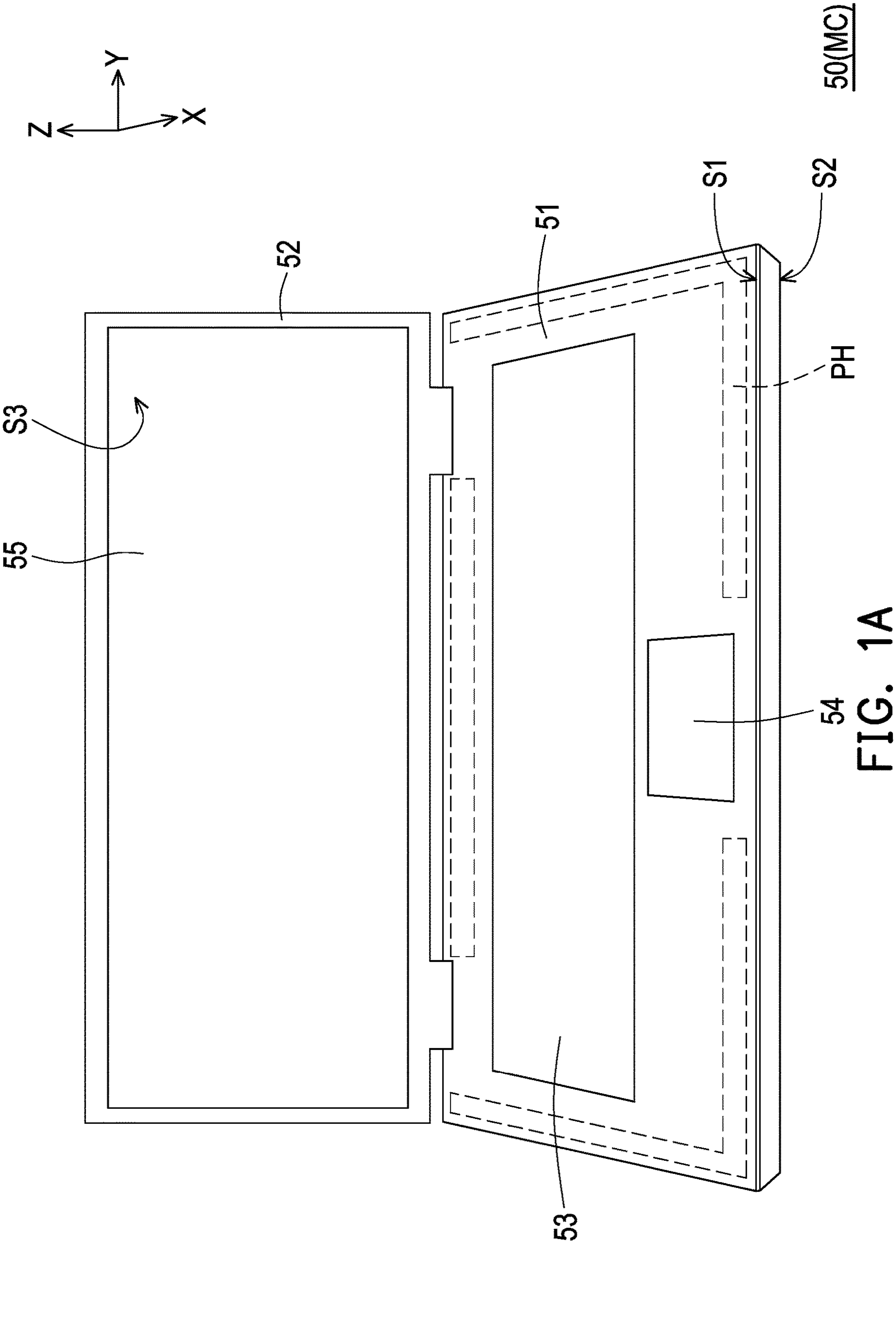
FIG. 1A is a three-dimensional view of an electronic device in a computer mode according to an embodiment of the disclosure.
Figure 1B:
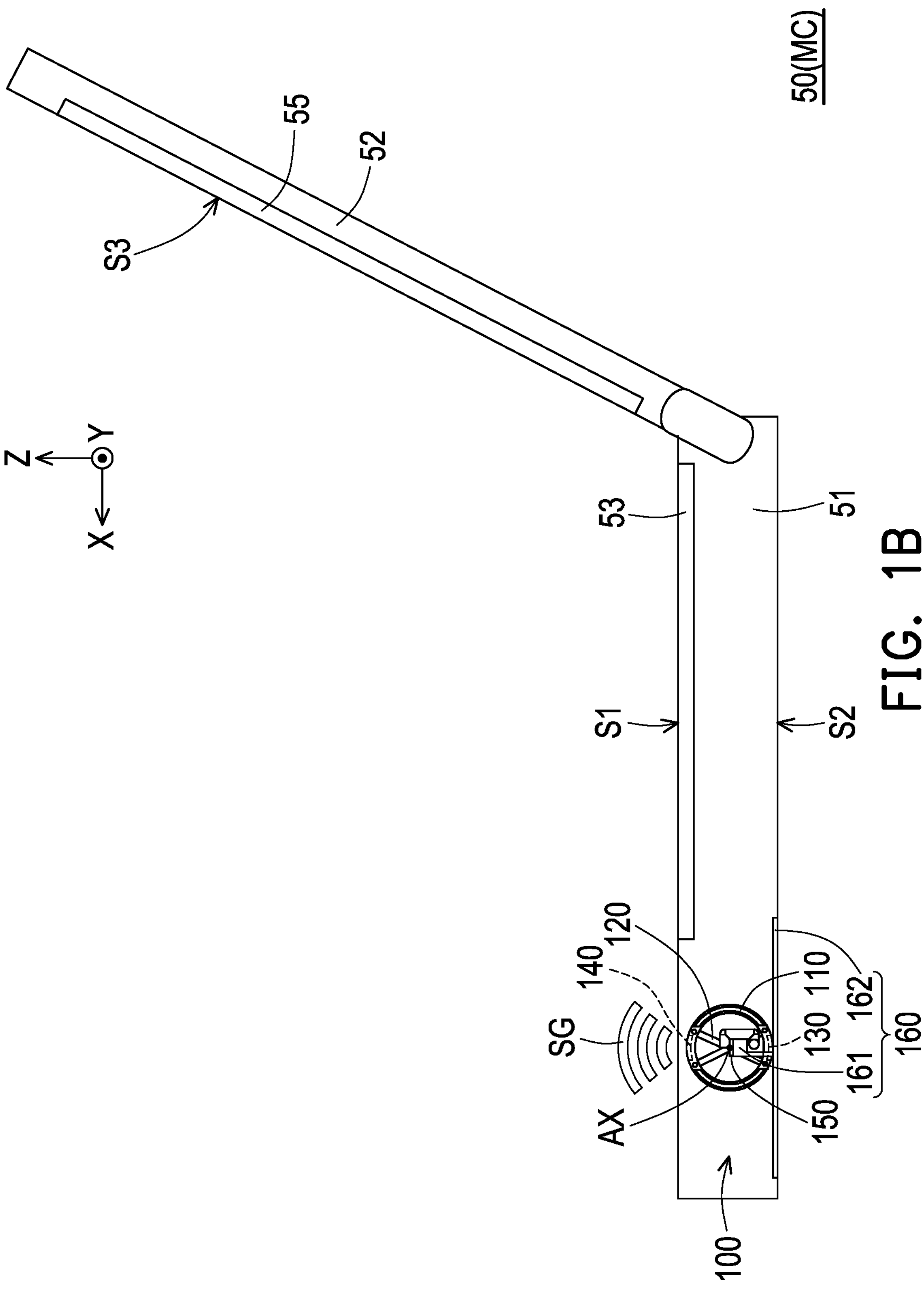
FIG. 1B is a side view of the electronic device of FIG. 1A.
Figure 2:
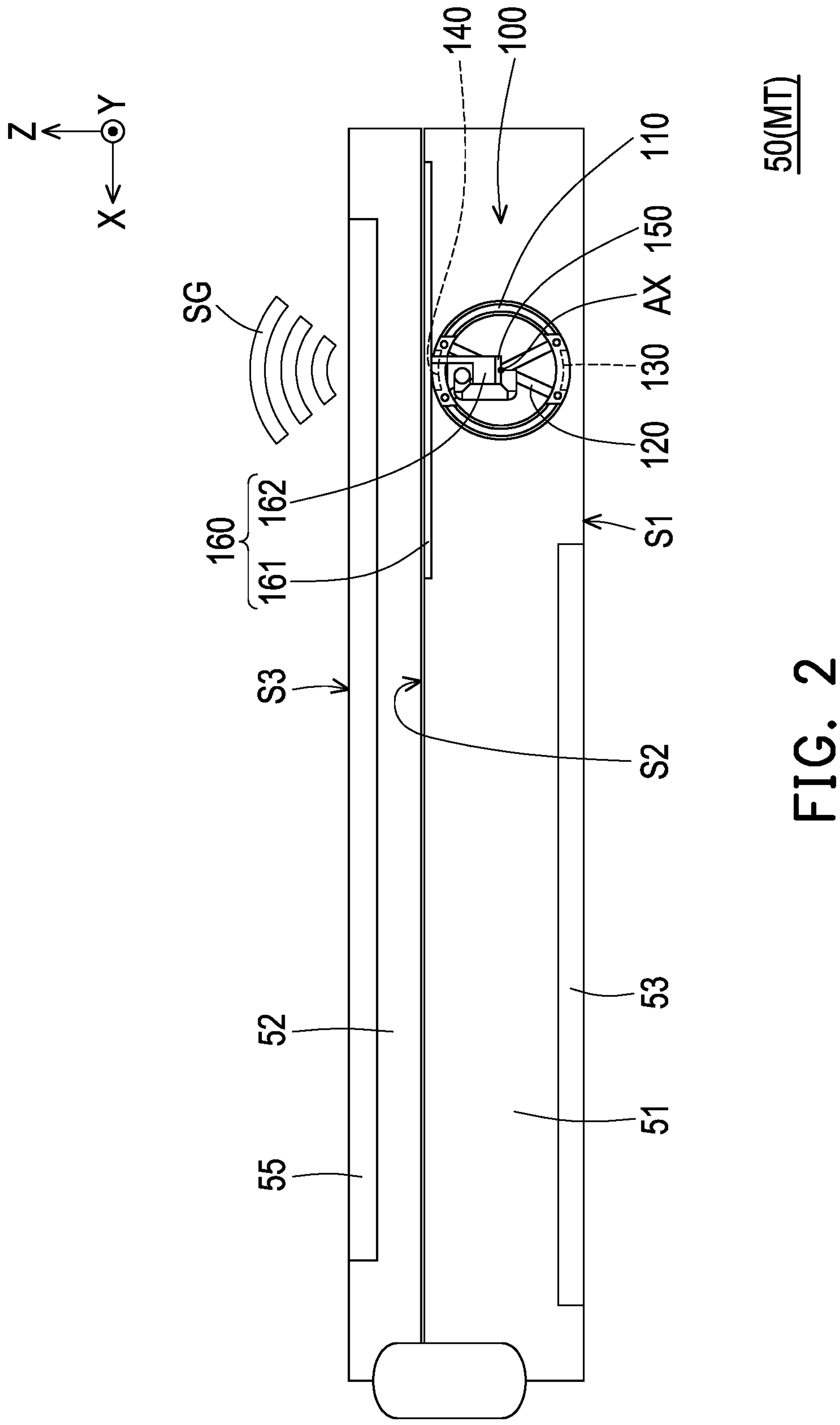
FIG. 2 is a side view of the electronic device of FIG. 1 in a tablet mode.
Figure 3:
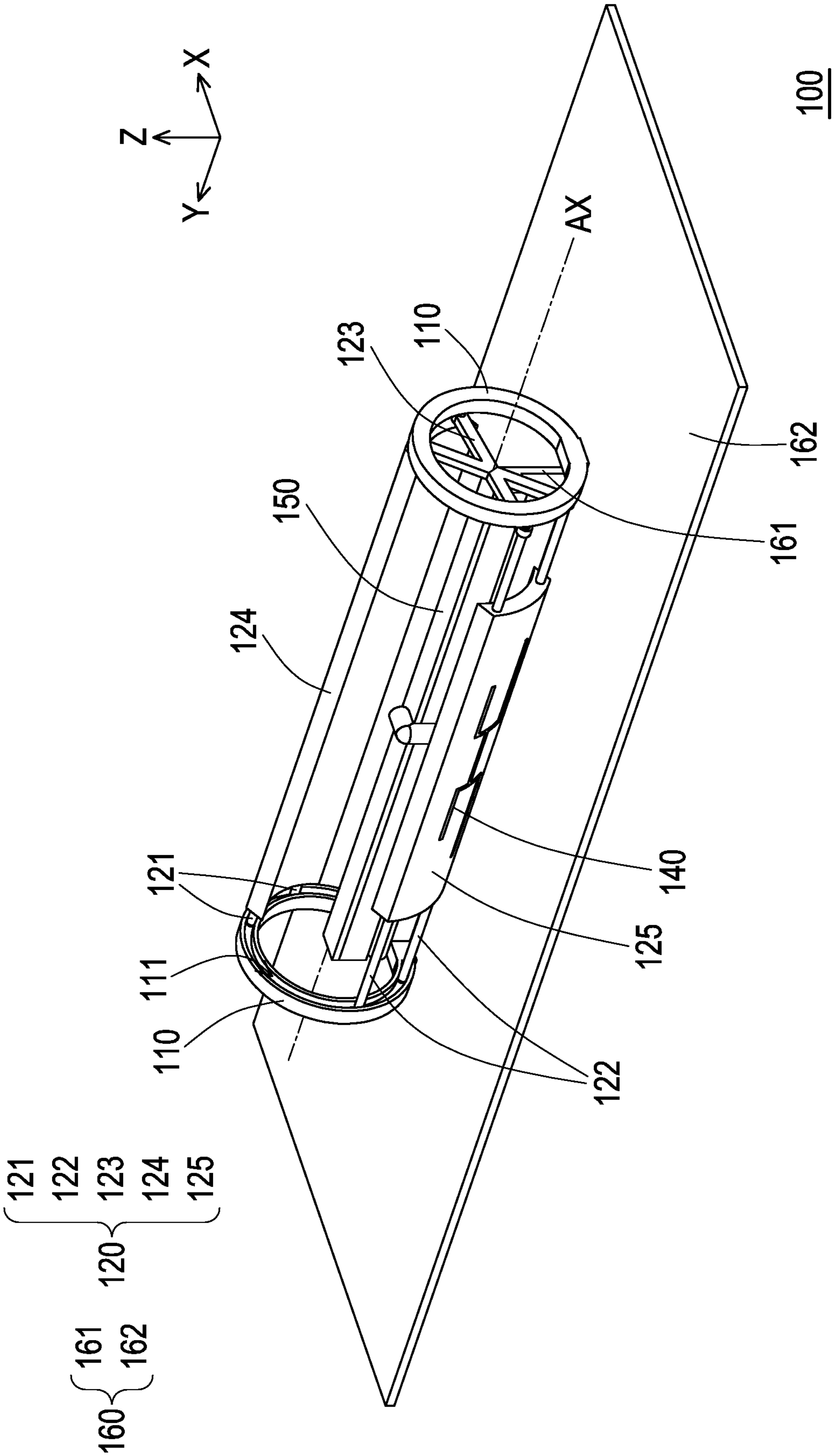
FIG. 3 is a three-dimensional view of the antenna module of FIG. 1.
Figure 4:
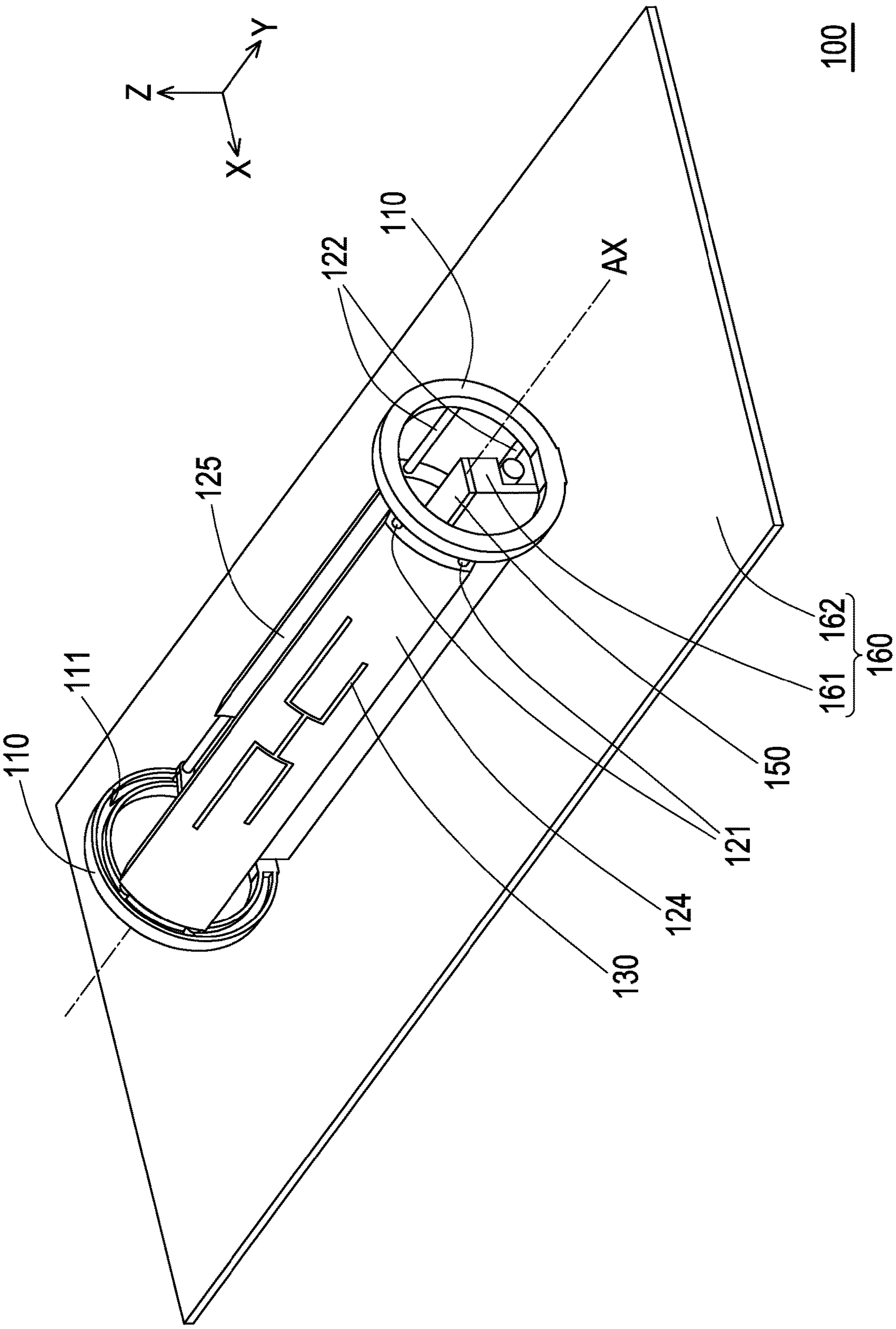
FIG. 4 is a three-dimensional view of FIG. 3 from another viewing angle.
Figure 5:
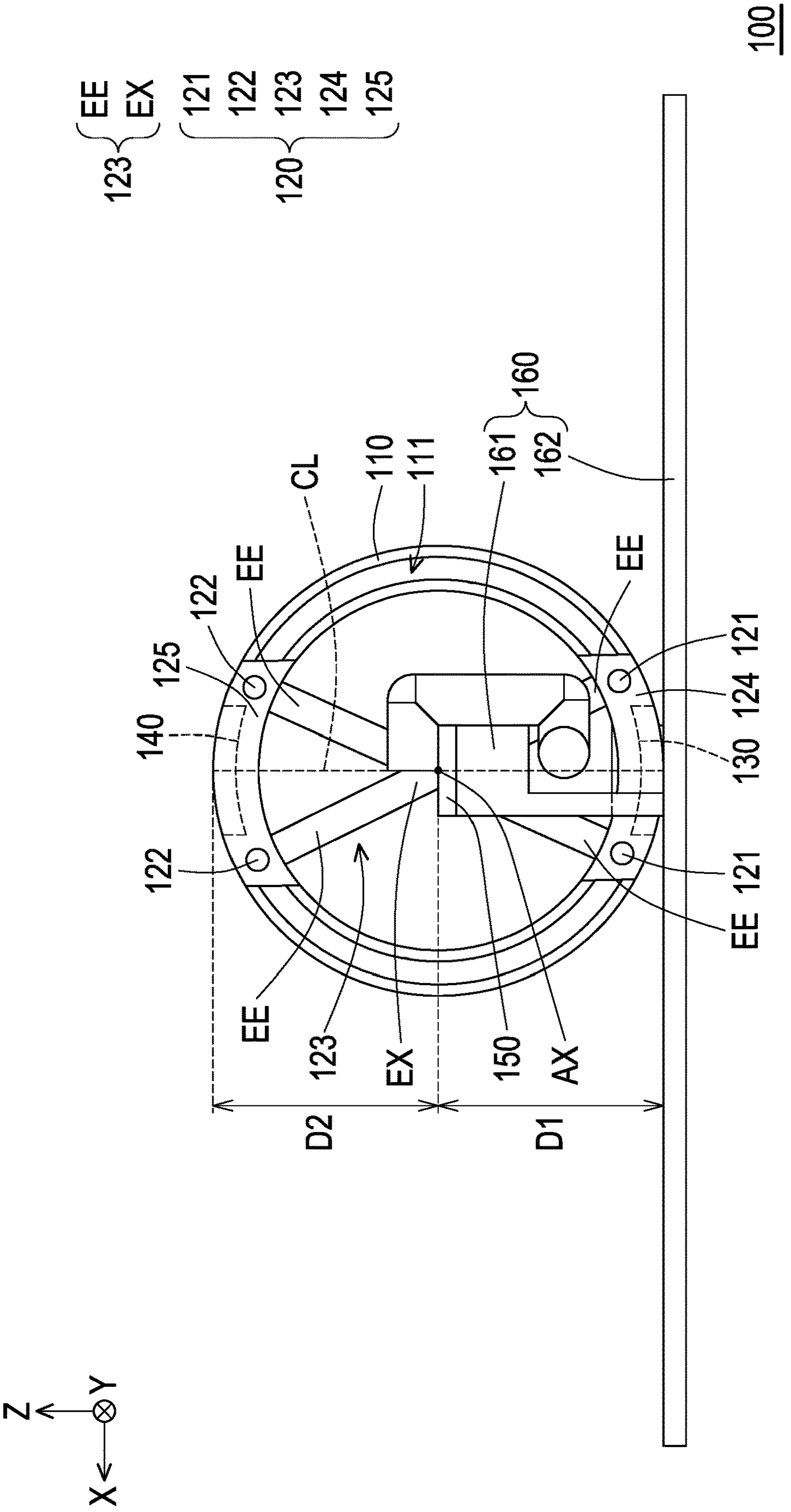
FIG. 5 is a side view of the antenna module of FIG. 1.

FIG. 1A is a three-dimensional view of an electronic device in a computer mode according to an embodiment of the disclosure. FIG. 1B is a side view of the electronic device of FIG. 1A. FIG. 2 is a side view of the electronic device of FIG. 1 in a tablet mode. FIG. 3 is a three-dimensional view of the antenna module of FIG. 1. FIG. 4 is a three-dimensional view of FIG. 3 from another viewing angle. FIG. 5 is a side view of the antenna module of FIG. 1. It should be noted that the Cartesian coordinates XYZ are also provided to facilitate the related description and reference of subsequent components. In addition, the proportional relationship between the size and thickness of the first body 51, the second body 52 and the antenna module 100 in the figure is only for illustration.

Referring to FIG. 1A to FIG. 2, the electronic device 50 of this embodiment includes a first body 51, a second body 52, and an antenna module 100 (FIG. 1B and FIG. 2). The first body 51 has a first surface S1 and a second surface S2 that are opposite to each other. The second body 52 is pivotally connected to the first body 51 along the Y axis and has a display surface S3. The antenna module 100 is adapted to be disposed to the first body 51.

Here, it should be noted that in this embodiment, the antenna module 100 is adapted to be disposed to the peripheral area PH of the first body 51 (i.e., the lower right area of the first body 51 in FIG. 1A), but not limited thereto. In this embodiment, the electronic device 50 is, for example, a two-in-one notebook computer, and includes a computer mode MC (FIG. 1A, FIG. 1B) and a tablet mode MT (FIG. 2). The first body 51 includes, for example, a keyboard module 53 and a touch panel module 54, and the second body 52 includes, for example, a display unit 55 having a display surface S3, but not limited thereto. In other embodiments, the first body 51 and the second body 52 are, for example, notebook computers with dual display units, but not limited thereto.

In detail, referring to FIG. 1B to FIG. 5, in this embodiment, the antenna module 100 includes a fixed member 110, a rotating component 120, a reflector 130, a director 140, and an antenna unit 150. The fixed member 110 is disposed to the first body 51 along the Z axis. The rotating component 120 is connected to the fixed member 110 rotatably along an axial line AX (i.e., parallel to the Y axis). The reflector 130 and the director 140 are respectively disposed to opposite sides of the rotating component 120. The antenna unit 150 is disposed to the first body 51 fixedly along the Z axis and on the axial line AX (i.e., parallel to the Y axis), and is disposed between the reflector 130 and the director 140.

As shown in FIG. 1B, when the second body 52 rotates relative to the first body 51 along the Y axis, and the display surface S3 faces the first surface S1 and is in the computer mode MC, the rotating component 120 rotates relative to the fixed member 110 along the axial line AX (i.e., parallel to the Y axis), and the second surface S2 of the first body 51 is the test surface for the SAR value of the electronic device 50. At this time, the reflector 130 is located between the antenna unit 150 and the second surface S2, and the director 140 is located between the antenna unit 150 and the first surface S1, so that an antenna signal SG of the antenna unit 150 radiates toward the first surface S1 relative to the second surface S2.

As shown in FIG. 2, when the second body 52 rotates relative to the first body 51 along the Y axis, and the second surface S2 is located between the first surface S1 and the display surface S3 and is in the tablet mode MT, the rotating component 120 rotates relative to the fixed member 110 along the axial line AX (i.e., parallel to the Y axis), and the first surface S1 of the first body 51 is the test surface for the SAR value of the electronic device 50. At this time, the reflector 130 is located between the antenna unit 150 and the first surface S1, and the director 140 is located between the antenna unit 150 and the second surface S2, so that an antenna signal SG of the antenna unit 150 radiates toward the second surface S2 relative to the first surface S1.

As described above, in the electronic device 50 of the disclosure, through the design of rotating the rotating component 120 relative to the fixed member 110 and disposing the reflector 130 and the director 140 to the rotating component 120, the radiation direction of the antenna signal SG of the antenna unit 150 in the antenna module 100 changes with the relative rotation of the first body 51 and the second body 52. Therefore, the radiation direction of the antenna signal SG is directed away from the test surface of the SAR value of the electronic device 50 in different usage modes (i.e., the radiation is directed away from the user), thereby reducing the SAR value of the electronic device 50 and preventing the electronic device 50 from sacrificing the wireless performance in order to pass the test specification.

The antenna module 100 is further described below.

Referring to FIG. 3 to FIG. 5, in this embodiment, the antenna module 100 further includes an antenna placement base 160. The antenna placement base 160 includes a placement portion 161 and a base portion 162 which are connected to each other. The antenna unit 150 is disposed to the placement portion 161, and the base portion 162 is disposed to the first body 51 fixedly (FIG. 1B and FIG. 2). The fixed members 110 are connected to the base portion 162 and are located at opposite ends of the antenna unit 150 in the direction of the axial line AX (i.e., the direction parallel to the Y axis), and are disposed to the first body 51 fixedly via the base portion 162 (FIG. 1B and FIG. 2).

Referring to FIG. 3 to FIG. 5, in this embodiment, the fixed member 110 has a sliding groove 111, the rotating component 120 includes a first rod structure 121 and a second rod structure 122 connected to each other, and the first rod structure 121 and the second rod structure 122 are disposed to the sliding groove 111 slidably to rotate around the axial line AX (i.e., parallel to the Y axis). The reflector 130 (FIG. 4) is disposed to the first rod structure 121, and the director 140 (FIG. 3) is disposed to the second rod structure 122.

In detail, referring to FIG. 5, in this embodiment, the rotating component 120 further includes a fixing structure 123, and the fixing structure 123 is connected between the first rod structure 121 and the second rod structure 122 to fix the relative positions of the first rod structure 121 and the second rod structure 122, so that the relative positions between the reflector 130 and the director 140 are fixed. Here, the fixing structure 123 is, for example, a cross structure, and includes four end portions EE and a cross portion EX connected between the four end portions EE. The first rod structure 121 is connected to two adjacent ones of the four end portions EE, the second rod structure 122 is connected to the other two adjacent ones of the four end portions EE, and the cross portion EX is located on the axial line AX, but not limited thereto.

In more detail, referring to FIG. 3 to FIG. 5, in this embodiment, the rotating component 120 includes a first bracket 124 and a second bracket 125. The first bracket 124 is disposed between the first rod structure 121 and the reflector 130, and the second bracket 125 is disposed between the second rod structure 122 and the director 140.

Furthermore, in this embodiment, the weight of the first bracket 124 is greater than the weight of the second bracket 125, and the antenna unit 150 is located on the connection line CL (FIG. 5) between the center of the reflector 130 and the center of the director 140, so that the reflector 130 is located below a gravitational direction (i.e., the −Z axis direction) relative to the director 140. Here, the material of the first bracket 124 is, for example, plastic and is the same as the material of the second bracket 125, and the volume of the first bracket 124 is greater than the volume of the second bracket 125, but the disclosure is not limited thereto.

In this way, the rotating component 120 may be driven to rotate by gravity through the weight difference between the first bracket 124 and the second bracket 125, so that there is no need to add other driving structures to the first body 51, thereby reducing the usage space of the antenna module 100 in the first body 51.

Figure 6A:
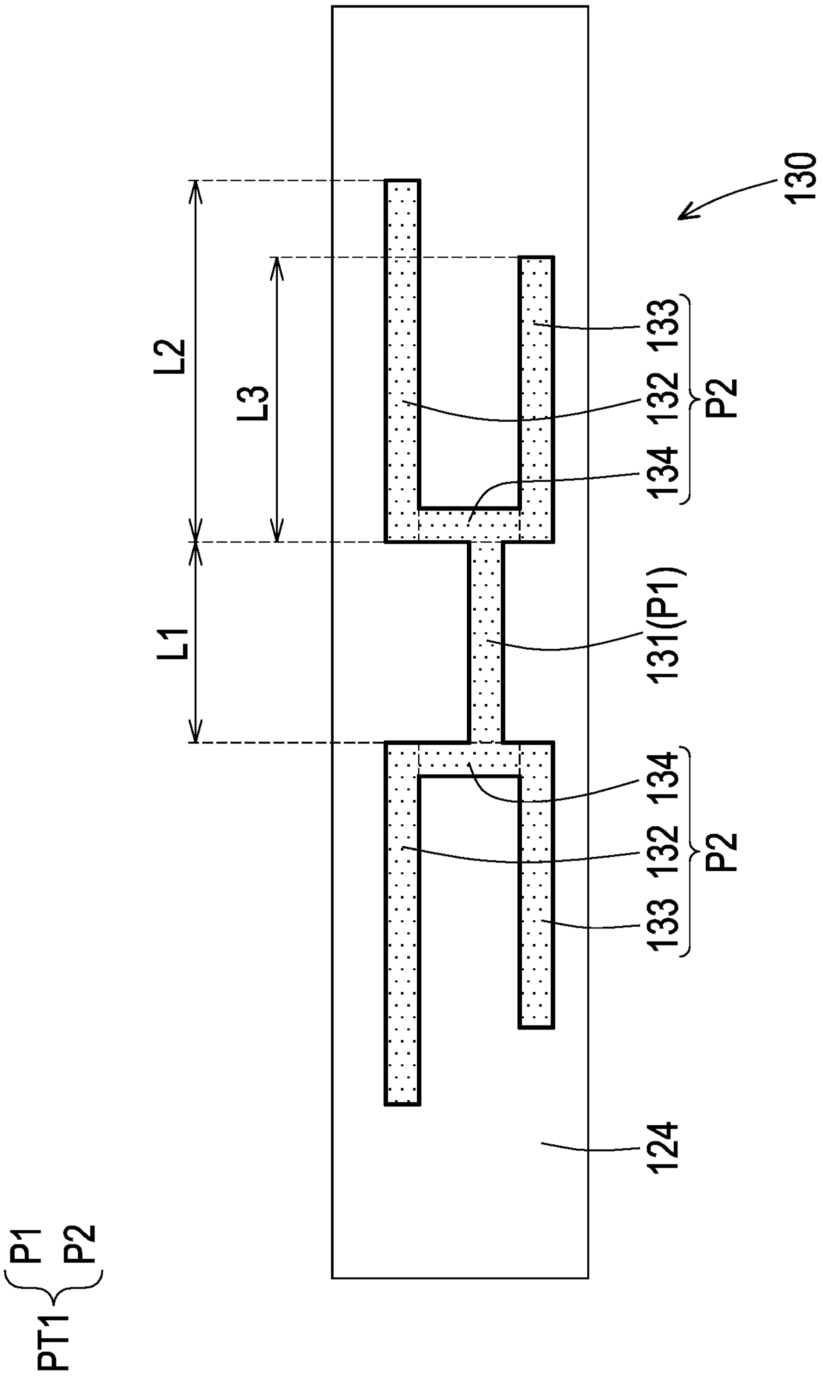
FIG. 6A is a top view of the reflector and the first bracket of the antenna module of FIG. 1.
Figure 6B:
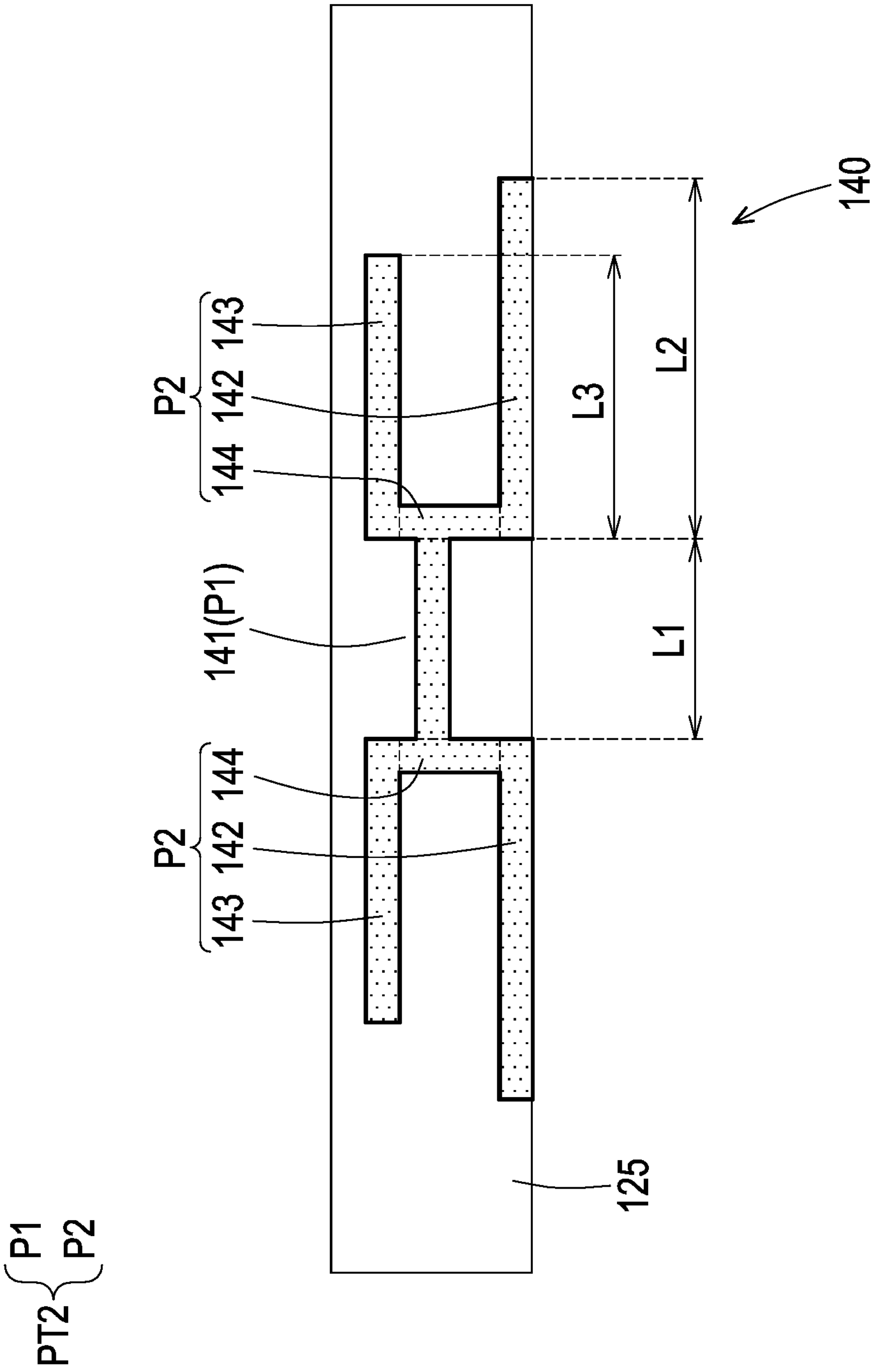
FIG. 6B is a top view of the director and the second bracket of the antenna module of FIG. 1.
Figure 6C:
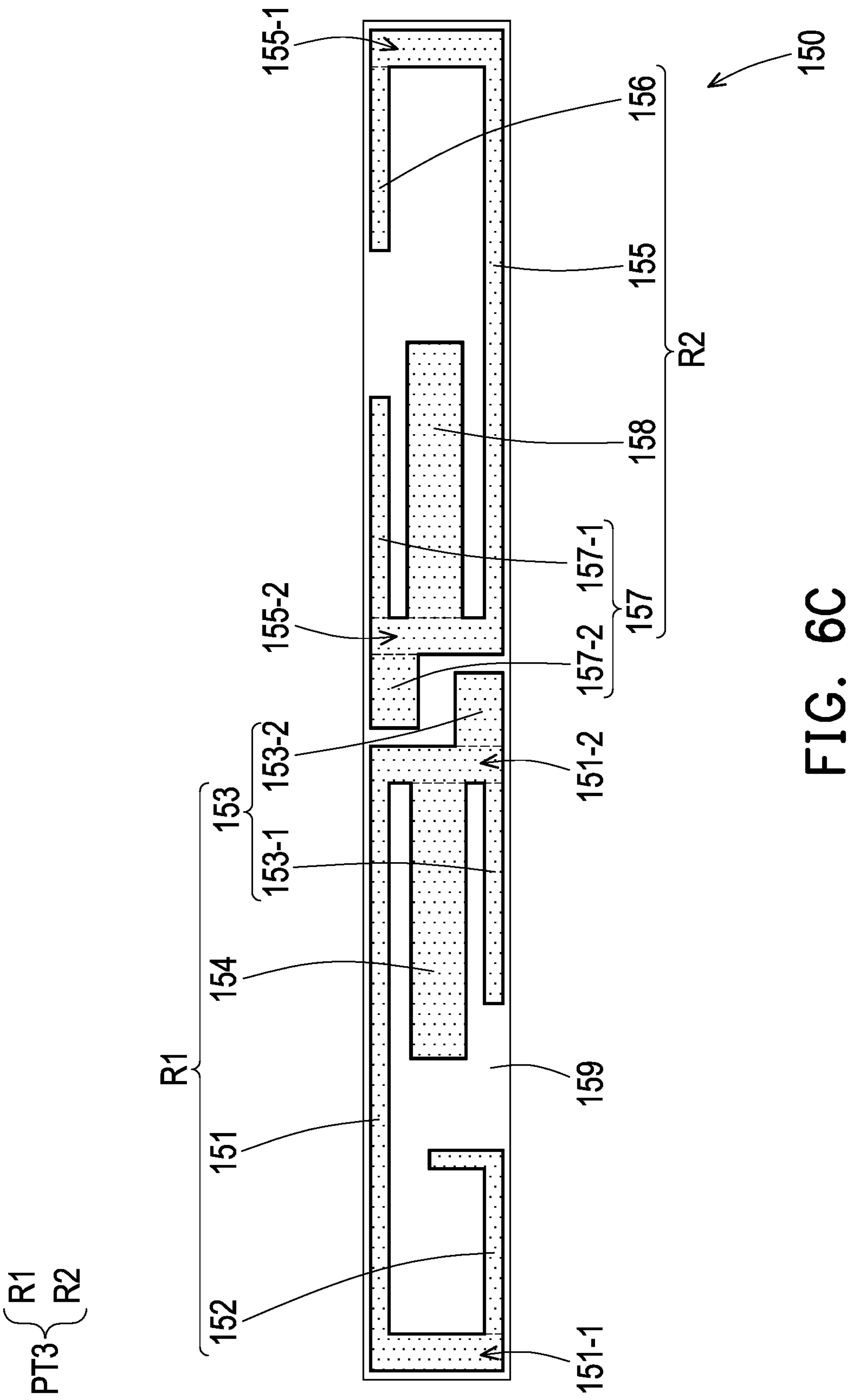
FIG. 6C is a top view of the antenna unit and the carrier of the antenna module of FIG. 1.

FIG. 6A is a top view of the reflector and the first bracket of the antenna module of FIG. 1. FIG. 6B is a top view of the director and the second bracket of the antenna module of FIG. 1. FIG. 6C is a top view of the antenna unit and the carrier of the antenna module of FIG. 1.

Referring to FIG. 5, in this embodiment, the antenna unit 150 resonates in a frequency band, the distance D1 between the antenna unit 150 and the reflector 130 is between 0.05 times the wavelength and 0.5 times the wavelength of the frequency band, and the distance D2 between the antenna unit 150 and the director 140 is between 0.05 times the wavelength and 0.5 times the wavelength of the frequency band.

In detail, referring to FIG. 6A to FIG. 6C, in this embodiment, the reflector 130 and the director 140 respectively include a similar patterns PT1 and PT2, and the antenna unit 150 includes a pattern PT3 corresponding to the patterns PT1 and PT2, to resonate in multiple frequency bands according to the usage requirements of the antenna module 100. Here, the patterns PT1, PT2, and PT3 are, for example, metal material patterns, but not limited thereto.

As shown in FIG. 6A and FIG. 6B, in this embodiment, the patterns PT1 and PT2 are respectively disposed to the first bracket 124 and the second bracket 125, and the patterns PT1 and PT2 both include a first portion P1 and two second portions P2 extending from the first portion P1 and disposed symmetrically.

As shown in FIG. 6A, in the pattern PT1, the first portion P1 includes a first segment 131, and each second portion P2 includes a second segment 132, a third segment 133, and a fourth segment 134. The first segment 131 is parallel to the second segment 132 and the third segment 133, the second segment 132 and the third segment 133 are vertically connected to opposite ends of the fourth segment 134 to form a U-shape, and the opening of the U-shape is disposed in the direction away from the first portion P1. The first segment 131 is close to the third segment 133 relative to the second segment 132, the distance between the two second portions P2 is equal to the length L1 of the first segment 131, and the length L2 of the second segment 132 is greater than the length L3 of the third segment 133, but not limited thereto.

As shown in FIG. 6B, in the pattern PT2, the first portion P1 includes a first segment 141, and each second portion P2 includes a second segment 142, a third segment 143, and a fourth segment 144. The first segment 141 is parallel to the second segment 142 and the third segment 143, the second segment 142 and the third segment 143 are vertically connected to opposite ends of the fourth segment 144 to form a U-shape, and the opening of the U-shape is disposed in the direction away from the first portion P1. The first segment 141 is close to the third segment 143 relative to the second segment 142, the distance between the two second portions P2 is equal to the length L1 of the first segment 141, and the length L2 of the second segment 142 is greater than the length L3 of the third segment 143, but not limited thereto.

As shown in FIG. 6C, in this embodiment, the pattern PT3 is disposed to the carrier 159 and includes an adjacent first region R1 and second region R2. The first region R1 includes a first segment 151, a second segment 152, a third segment 153, and a fourth segment 154. The first segment 151 is an inverted U-shape and has a first end portion 151-1 and a second end portion 151-2. The second segment 152 is an L-shape and is vertically connected to the first end portion 151-1, the third segment 153 is vertically connected to the second end portion 151-2 and includes a first end portion 153-1 extending toward the second segment 152 and a second end portion 153-2 extending away from the second segment 152, and the fourth segment 154 is parallel to the third segment 153 and vertically connected to the first segment 151, and extends toward the second segment 152, but not limited thereto.

The second region R2 includes a fifth segment 155, a sixth segment 156, a seventh segment 157, and an eighth segment 158. The fifth segment 155 is an inverted U-shape and has a first end portion 155-1 and a second end portion 155-2. The sixth segment 156 is vertically connected to the first end portion 155-1, the seventh segment 157 is vertically connected to the second end portion 155-2 and includes a first end portion 157-1 extending toward the sixth segment 156 and a second end portion 157-2 extending away from the sixth segment 156, and the eighth segment 158 is parallel to the seventh segment 157 and vertically connected to the fifth segment 155, and extends toward the sixth segment 156, but not limited thereto.

In other embodiments, the patterns of the reflector, the director, and the antenna unit may be different from the aforementioned embodiments. For example, as shown in FIG. 7A to FIG. 7C, the reflector 130A and the director 140A respectively include similar patterns PT1A and PT2A, and the antenna unit 150A includes a pattern PT3A corresponding to the patterns PT1A and PT2A, to resonate in a single frequency band according to the usage requirements of the antenna module 100A (not shown), but not limited thereto.

Figure 7A:
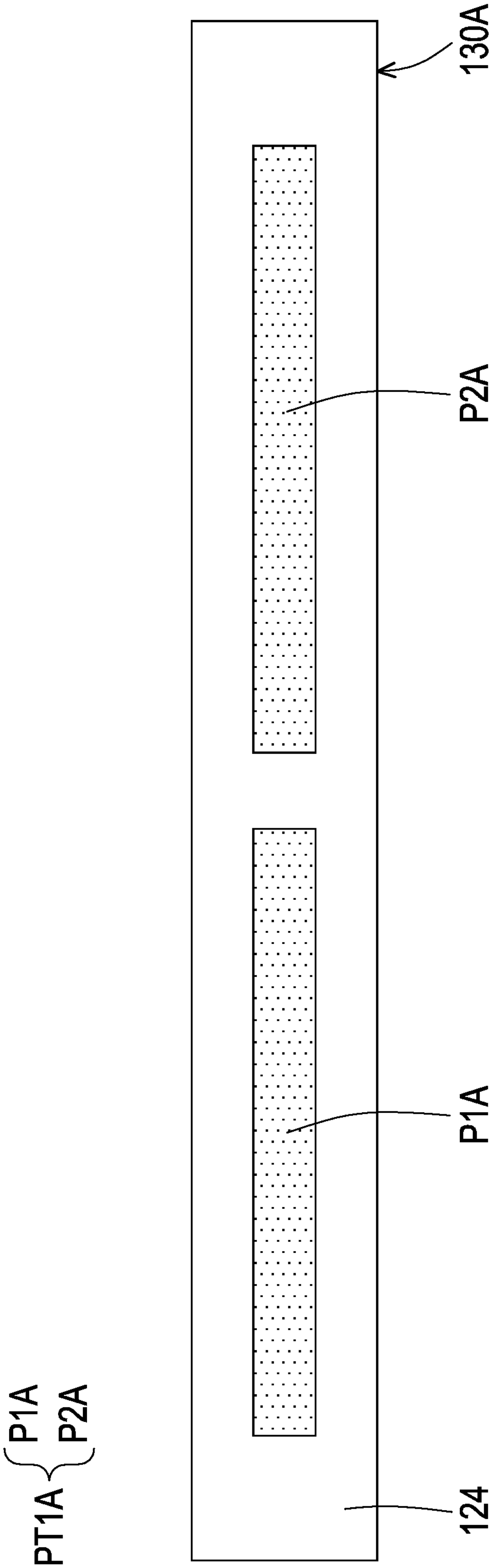
FIG. 7A is a top view of the reflector and the first bracket of the antenna module according to other embodiments of the disclosure.
Figure 7B:
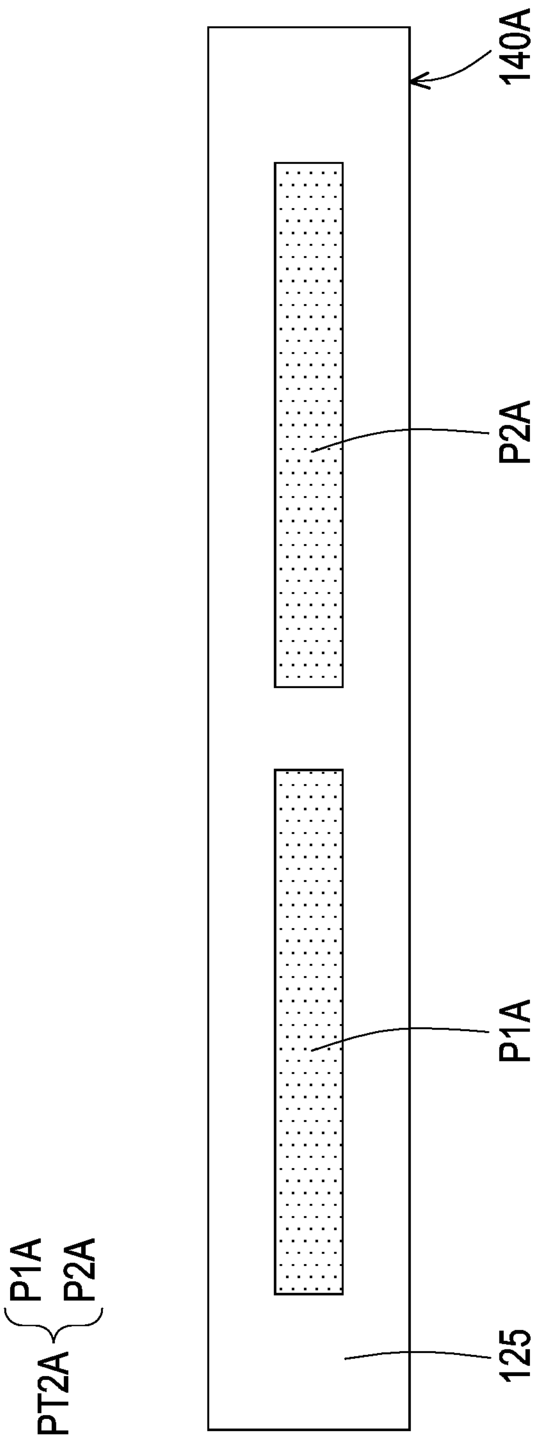
FIG. 7B is a top view of the director and the second bracket of the antenna module of FIG. 7A.

In detail, as shown in FIG. 7A and FIG. 7B, in this embodiment, the patterns PT1A and PT2A are respectively disposed to the first bracket 124 and the second bracket 125, and the patterns PT1A and PT2A both include a first portion P1A and a second portion P2A symmetrically disposed, in which the first portion P1A and the second portion P2A are rectangular, but not limited thereto.

Figure 7C:
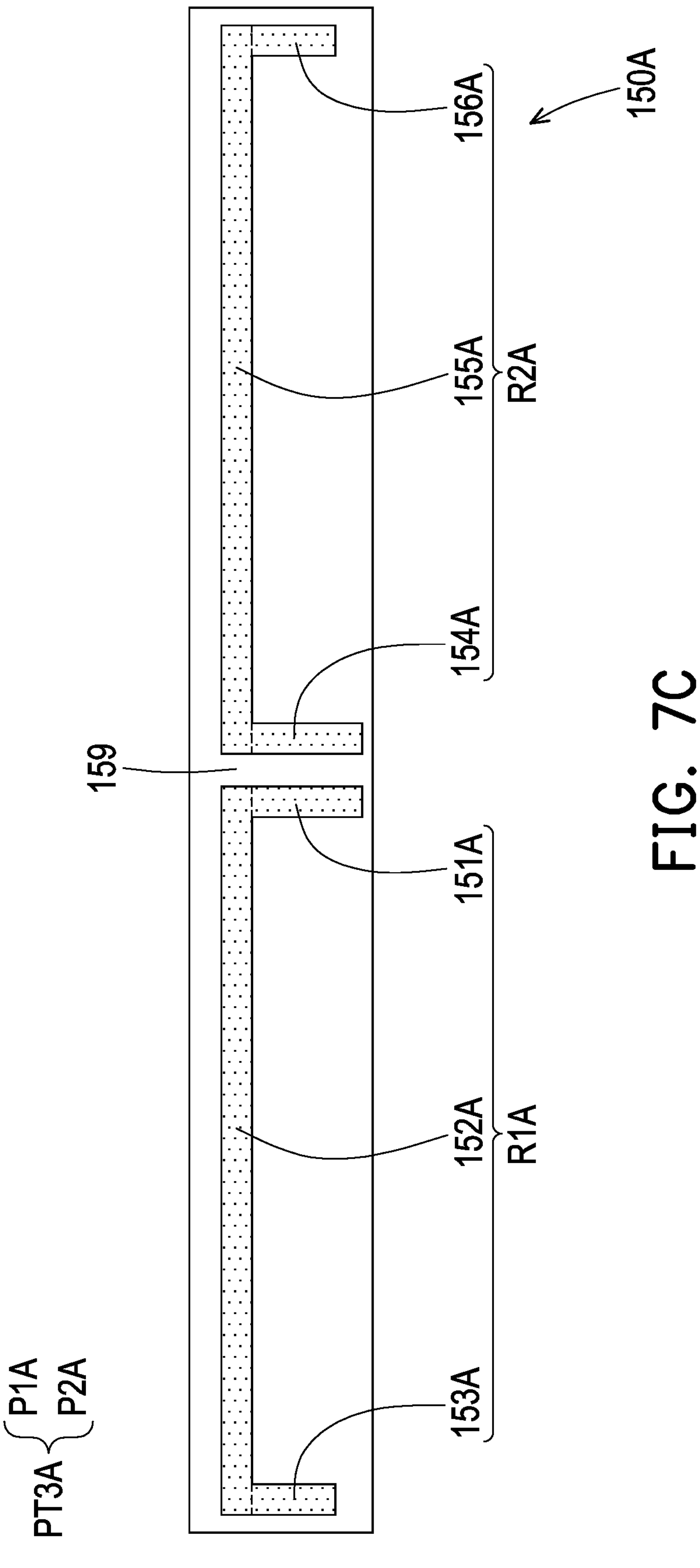
FIG. 7C is a top view of the antenna unit and the carrier of the antenna module of FIG. 7A.

As shown in FIG. 7C, in this embodiment, the pattern PT3A is disposed to the carrier 159 and includes a first region R1A and a second region R2A that are symmetrically disposed and adjacent to each other. The first region R1A includes a first segment 151A, a second segment 152A, and a third segment 153A, and the second region R2A includes a fourth segment 154A, a fifth segment 155A, and a sixth segment 156A. The first segment 151A and the third segment 153A are respectively vertically connected to opposite ends of the second segment 152A to form an inverted U-shape, and the fourth segment 154A and the sixth segment 156A are respectively vertically connected to opposite ends of the fifth segment 155A to form an inverted U shape. The length of the first segment 151A is greater than the length of the third segment 153A, and the length of the fourth segment 154A is greater than the length of the sixth segment 156A, but not limited thereto.

It is to be noted that the following embodiments use the reference numerals and a part of the contents of the above embodiments, and the same reference numerals are used to denote the same or similar elements, and the description of the same technical contents is omitted. For the description of the omitted part, reference may be made to the above embodiments, and details are not described in the following embodiments.

Figure 8:
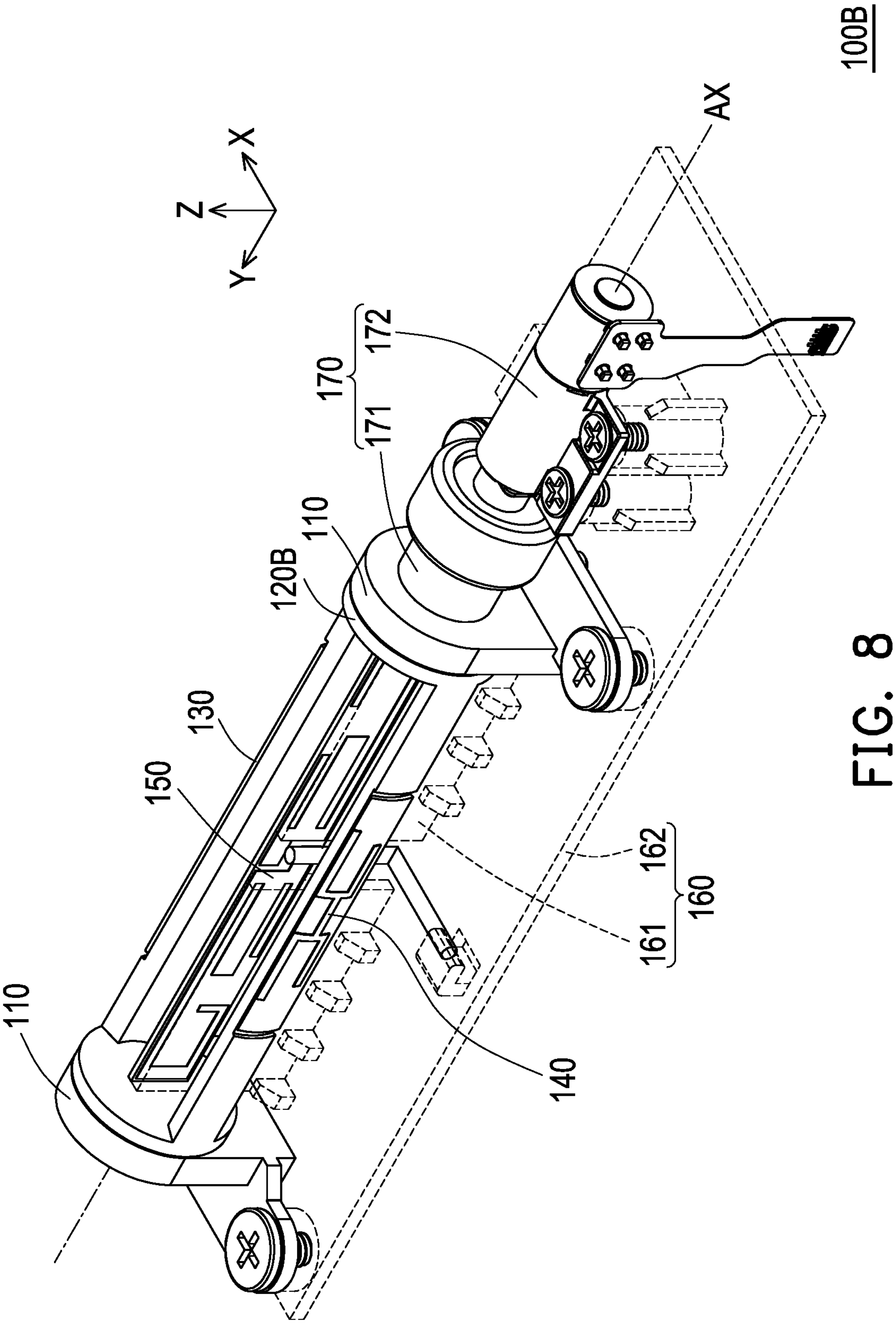
FIG. 8 is a three-dimensional view of an antenna module according to other embodiments of the disclosure.
Figure 9:
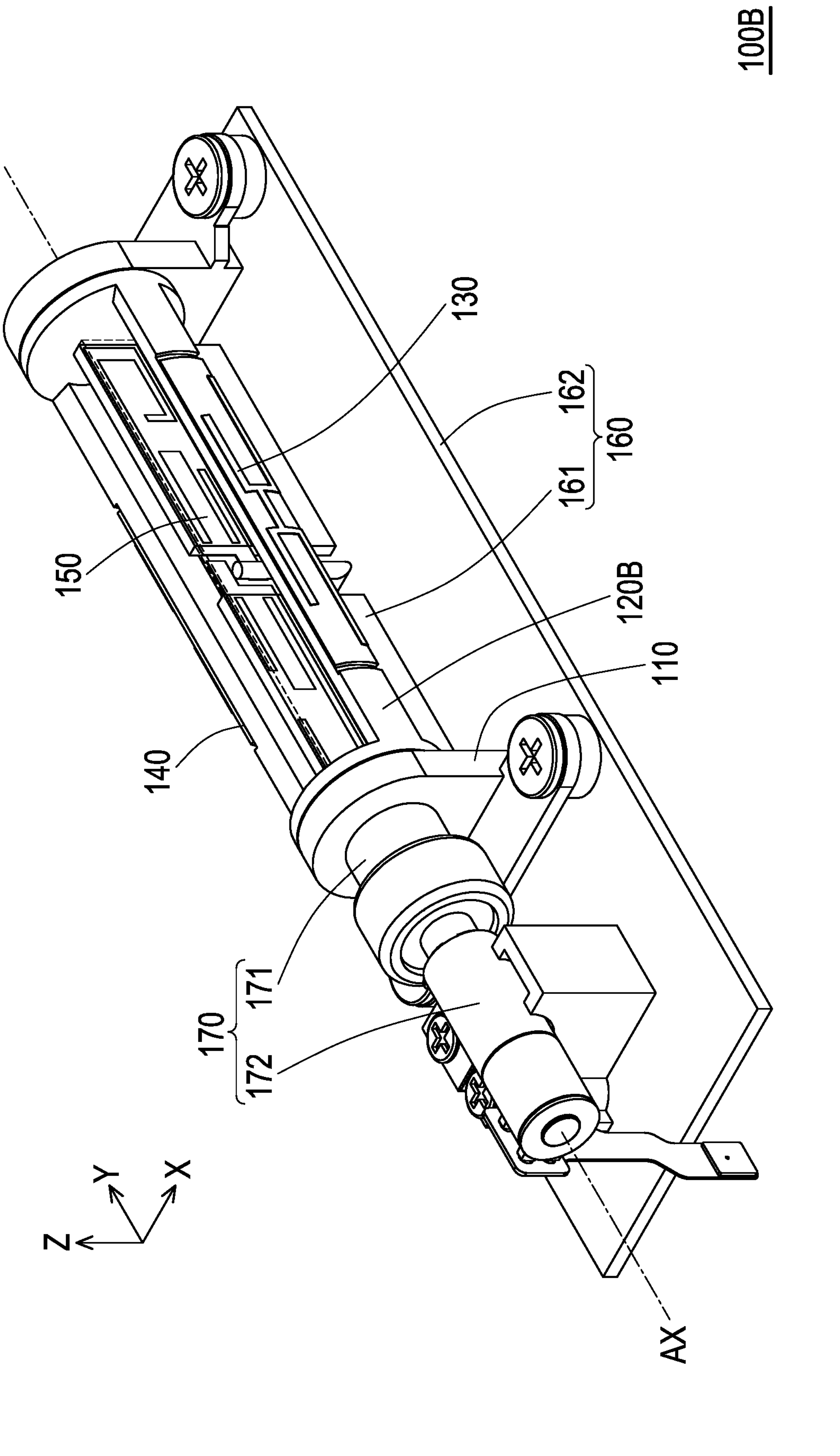
FIG. 9 is a three-dimensional view of FIG. 8 from another viewing angle.

FIG. 8 is a three-dimensional view of an antenna module according to other embodiments of the disclosure. FIG. 9 is a three-dimensional view of FIG. 8 from another viewing angle. Referring to FIG. 3 and FIG. 8 at the same time, the antenna module 100 of this embodiment is similar to the antenna module 100B of FIG. 8. The difference between the two is that the antenna module 100B further includes a driving module 170, and the first rod structure, the second rod structure, and the fixing structure of the rotating component 120B are an integral structure to fix the relative positions of the reflector 130 and the director 140.

Referring to FIG. 8 and FIG. 9, in this embodiment, the driving module 170 is connected to the rotating component 120B and drives the rotating component 120B to rotate relative to the fixed member 110 along the axial line AX (i.e., parallel to the Y axis).

In detail, in this embodiment, the driving module 170 includes a connecting structure 171 and a driving member 172. The connecting structure 171 is connected to the rotating component 120B fixedly, and is connected to the driving member 172 rotatably along the axial line AX (i.e., parallel to the Y axis). The driving member 172 is disposed to the base portion 162 and is used for driving the connecting structure 171 to rotate relative to the fixed member 110 along the axial line AX (i.e., parallel to the Y axis). Here, the driving member 172 is, for example, a motor, but is not limited thereto.

In this way, through the design of driving the rotation of the rotating member 120B with the driving module 170 relative to the fixed member 110 and respectively disposing the reflector 130 and the director 140 to the rotating component 120, the radiation direction of the antenna signal SG (not shown) of the antenna unit 150 in the antenna module 100B changes according to different usage modes, so that the radiation direction of the antenna signal SG (not shown) is directed away from the test surface of the SAR value of the electronic device (not shown) disposed by the antenna module 100B in different usage modes (i.e., the radiation is directed away from the user), thereby reducing the SAR value of the electronic device (not shown) and preventing the electronic device from sacrificing the wireless performance in order to pass the test specification.

To sum up, in the electronic device of the disclosure, through the design of rotating the rotating component relative to the fixed member and respectively disposing the reflector and the director to the rotating component, the radiation direction of the antenna signal of the antenna unit in the antenna module changes with the relative rotation of the first body and the second body. Therefore, the radiation direction of the antenna signal is directed away from the test surface of the SAR value of the electronic device in different usage modes (i.e., the radiation is directed away from the user), thereby reducing the SAR value of the electronic device and avoiding sacrificing the wireless performance in order to pass the test specification.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. An antenna module, adapted to be disposed to an electronic device, the electronic device comprising a first body and a second body pivotally connected to each other, the first body having a first surface and a second surface opposite to each other, the antenna module comprising:

a fixed member, adapted to be disposed to the first body fixedly;

a rotating component, connected to the fixed member rotatably along an axial line;

a reflector, disposed to the rotating component;

a director, disposed to the rotating component; and an antenna unit, adapted to be disposed to the first body fixedly and on the axial line, and disposed between the reflector and the director, wherein when the first body and the second body rotate relative to each other, the rotating component rotates relative to the fixed member, the reflector is located between the antenna unit and one of the first surface and the second surface, and the director is located between the antenna unit and another one of the first surface and the second surface, so that an antenna signal of the antenna unit radiates toward the another one of the first surface and the second surface.

2. The antenna module according to claim 1, wherein the antenna unit is located on a connection line between a center of the reflector and a center of the director.

3. The antenna module according to claim 1, wherein the reflector is located below a gravitational direction relative to the director.

4. The antenna module according to claim 3, wherein the fixed member has a sliding groove, the rotating component comprises a first rod structure and a second rod structure connected to each other, the first rod structure and the second rod structure are disposed to the sliding groove slidably to rotate around the axial line, the reflector is disposed to the first rod structure, and the director is disposed to the second rod structure.

5. The antenna module according to claim 4, wherein the rotating component further comprises a fixing structure, the fixing structure is connected between the first rod structure and the second rod structure to fix relative positions of the first rod structure and the second rod structure.

6. The antenna module according to claim 4, wherein the rotating component comprises a first bracket and a second bracket, the first bracket is disposed between the first rod structure and the reflector, the second bracket is disposed between the second rod structure and the director, and a weight of the first bracket is greater than a weight of the second bracket.

7. The antenna module according to claim 1, wherein the antenna unit is adapted to resonate in a frequency band, a distance between the antenna unit and the reflector is between 0.05 times a wavelength of the frequency band and 0.5 times the wavelength of the frequency band.

8. The antenna module according to claim 1, wherein the antenna unit is adapted to resonate in a frequency band, a distance between the antenna unit and the director is between 0.05 times a wavelength of the frequency band and 0.5 times the wavelength of the frequency band.

9. The antenna module according to claim 1, further comprising a driving module, the driving module is connected to the rotating component, and the driving module drives the rotating component to rotate relative to the fixed member.

10. An electronic device, comprising:

a first body, having a first surface and a second surface opposite to each other;

a second body, pivotally connected to the first body and having a display surface; and an antenna module, comprising:

a fixed member, disposed to the first body fixedly;

a rotating component, connected to the fixed member rotatably along an axial line;

a reflector, disposed to the rotating component;

a director, disposed to the rotating component; and an antenna unit, disposed to the first body fixedly and on the axial line, and disposed between the reflector and the director, wherein when the second body rotates relative to the first body and the display surface faces the first surface, the rotating component rotates relative to the fixed member, the reflector is located between the antenna unit and the second surface, and the director is located between the antenna unit and the first surface, so that an antenna signal of the antenna unit radiates toward the first surface, when the second body rotates relative to the first body, and the second surface is located between the first surface and the display surface, the rotating component rotates relative to the fixed member, the reflector is located between the antenna unit and the first surface, and the director is located between the antenna unit and the second surface, so that the antenna signal of the antenna unit radiates toward the second surface.

* * * * *